US008916774B2

(12) United States Patent
Richards et al.

(10) Patent No.: US 8,916,774 B2
(45) Date of Patent: Dec. 23, 2014

(54) POSABLE ELECTRICAL CABLE

(75) Inventors: Christopher F. Richards, Fountain Hills, AZ (US); Bradley M. Strahle, Crestline, CA (US); Dany Nikolova Paragouteva, Glendale, CA (US)

(73) Assignee: Performance Designed Products LLC, Sherman Oaks, CA (US)

( * ) Notice: Subject to any disclaimer, the term of this patent is extended or adjusted under 35 U.S.C. 154(b) by 291 days.

(21) Appl. No.: 13/465,883

(22) Filed: May 7, 2012

(65) Prior Publication Data

US 2013/0292171 A1    Nov. 7, 2013

(51) Int. Cl.
*H01B 7/04* (2006.01)
(52) U.S. Cl.
USPC ......... 174/70 C; 174/72 R; 439/580; 439/639
(58) Field of Classification Search
CPC ........... H02G 3/00; H02G 3/0487; H01R 9/03
USPC ....... 174/70 C, 70 R, 68.1, 71 R, 72 R, 72 A; 439/639, 638
See application file for complete search history.

(56) References Cited

U.S. PATENT DOCUMENTS

| 4,280,062 | A * | 7/1981 | Miller et al. ..................... 315/82 |
| 4,846,697 | A * | 7/1989 | Rodgers ........................... 439/35 |
| 6,530,085 | B1 * | 3/2003 | Perlman ........................... 725/82 |
| 6,594,436 | B2 * | 7/2003 | Sun et al. ....................... 385/137 |
| 6,699,063 | B2 * | 3/2004 | Lebender ....................... 439/451 |
| 7,614,427 | B2 * | 11/2009 | McKane ........................ 138/110 |
| 8,525,029 | B2 * | 9/2013 | Kato et al. ................. 174/113 R |
| 2003/0109171 | A1 * | 6/2003 | Morgan ......................... 439/502 |
| 2008/0194149 | A1 | 8/2008 | Kim |
| 2008/0250632 | A1 * | 10/2008 | Dayton et al. .................. 29/825 |
| 2009/0242066 | A1 | 10/2009 | McKane |
| 2011/0070769 | A1 | 3/2011 | Lin |
| 2011/0171853 | A1 * | 7/2011 | Holland ......................... 439/502 |

FOREIGN PATENT DOCUMENTS

EP        1343179        9/2003

OTHER PUBLICATIONS

International Search Report and the Written Opinion for International App No. PCT/US2013/039827, mailed Nov. 6, 2013, Authorized Officer: Huniak, Amandine.

* cited by examiner

*Primary Examiner* — Angel R Estrada
*Assistant Examiner* — Dimary Lopez Cruz
(74) *Attorney, Agent, or Firm* — Sheppard Mullin Richter & Hampton LLP

(57) ABSTRACT

Various embodiments of the invention provide cables configured for communicating electrical signals. In some embodiments, an electrical cable is provided comprising: a first connector portion; a second connector portion; and a cable portion coupling the first connector portion to the second connector portion, where the cable portion includes: a conduit portion comprising an electrical conductor configured to carry an electrical signal between the first connector portion and the second connector portion, a first wire portion coupling the first connector portion to the conduit portion and comprising the electrical conductor, and a second wire portion coupling the second connector portion to the conduit portion and comprising the electrical conductor, wherein the conduit portion is flexible, and at least one of the first wire portion and the second wire portions is flexible and posable such that a user can selectively bend the one wire portion to form and retain a first shape.

21 Claims, 3 Drawing Sheets

POSABLE ELECTRICAL CABLE

FIELD OF THE INVENTION

Various embodiments relate to cables, and more particularly, some embodiments relate to cables configured to communicate an electrical signal and having posable features.

DESCRIPTION OF THE RELATED ART

Electrical cables have long been used and associated with electronic devices, especially with respect to computers and with respect to audio-visual equipment. In addition to those that provide power to electronics devices, electrical cables also interconnect and facilitate communications between electronic devices. For example, it is commonly known that certain electrical cables enable network communication between computers, and that other electrical cables allow for a television to receive high-definition video from a video components (e.g., satellite receiver, Blu-ray® player).

As use of electronic devices has grown over the years, so has the need for the electronic devices to interconnect with one another, usually by way of a wired connection or a wireless connection. For some electronic devices, this results in a number of electrical cables being required to operate the electronic device, with some devices requiring three or more electrical cables to properly operate. This is common in home audio-visual configurations, where a television is usually physically connected to multiple audio-video sources simultaneously, and each physical connection uses a single electrical cable to establish a connection between the television and a source. For instance, where a home audio-visual configuration includes a television, a cable television receiver, a first game console, and a second game console, each of the cable television receiver, the first game console, and the second game console could be connected to the television using a separate audio-visual cable (e.g., High-Definition Multimedia Interface (HDMI) cable, a Digital Video Interface (DVI) cable, or an RCA cable) between the television and each source. Such configurations allow a user to select and view from one or more of the multiple audio-video sources without ever having to change any physical connections between the television and audio-visual sources (i.e., based on user input, the internal components of the television selects from one or more of the multiple audio-visual connected to the television).

However, because of the number of electrical cables used with certain electronic devices (especially audio-visual equipment), the areas surrounding those devices tend to be cluttered with individual electrical cables, thereby making such areas not only unsightly, but also making management of the electrical cables difficult (e.g., tangled electrical cables).

BRIEF SUMMARY OF VARIOUS EMBODIMENTS

According to various embodiments of the invention, cables configured for communicating electrical signals are provided. Hereinafter, cables configured for communicating electrical signals will also be referred to as electrical cables. Some embodiments of the present invention allow for cable assemblies that provide improved organization and arrangement of electrical cables. As a result, some embodiments of the invention provide improved management of the electrical cables, makes the arrangement of electrical cables visually appealing, and allows for easier connection between electrical devices, such as audio-visual equipment and computer components.

In some embodiments, the electrical cable comprises: a first connector portion; a second connector portion; and a cable portion coupling the first connector portion to the second connector portion, where the cable portion includes: a conduit portion comprising an electrical conductor configured to carry an electrical signal between the first connector portion and the second connector portion, a first wire portion coupling the first connector portion to the conduit portion and comprising the electrical conductor, and a second wire portion coupling the second connector portion to the conduit portion and comprising the electrical conductor, wherein the conduit portion is flexible, and at least one of the first wire portion and the second wire portions is flexible and posable such that a user can selectively bend the one wire portion to form and retain a first shape. Further, in some such embodiments, the one wire portion is further flexible and posable such that the user can selectively change the one wire portion from forming and retaining the first shape to forming and retaining a second shape.

For example, a first wire portion and a second wire portion may first be bent into a first shape that forms a "S," and then, the second wire portion can be subsequently reshaped (i.e., changed) to a second shape that forms an "L." Depending on the embodiment, the first wire portion or the second wire portion could be flexible and posable due to the electrical conductor contained therein, or due to the sheath covering the flexible and posable wire portion.

In various embodiments, the conduit portion is flexible but non-posable. Accordingly, for some embodiments, the first wire portion or the second wire portion can be selectively shaped into a semi-static form while the conduit portion remains pliable for non-static arrangement, thereby allowing for improved organization and arrangement of the overall electrical cable. Depending on the embodiment, the conduit portion may be flexible but remain non-posable due to it's sheathing.

In additional embodiments, the conduit portion has an exterior surface comprising a first side that is substantially flat, and a second side that is substantially flat, opposite the first side, and substantially parallel to the first side. In further such embodiments, the exterior surface further comprises a third side that is substantially flat, and a fourth side that is substantially flat, opposite the third side, and substantially parallel to the third side, wherein the third and the fourth sides are divergent to the first and second sides. For example, in some embodiments, the conduit portion has a substantially square or rectangular cross section, where the first and second side are parallel with respect to one another, the third and fourth sides are parallel with one another, and the third and fourth sides are perpendicular with respect to the first and second sides.

In various embodiments, where the conduit portion has a substantially square or rectangular cross section, the conduit portion may be as slender or slenderer than either the first or second wire portions. With such embodiments, the electrical cable is easier to pass through holes (e.g., through a wall), easier to place dispose against walls (e.g., along a wall to a flat screen television mounted on the same wall), easier to bundle together (e.g., conduit portions of several electrical cables in accordance with an embodiment of the invention can be stacked and tied together), and easier to bend (e./g., along the conduit's flat surfaces).

In some embodiments, the first connector portion comprises a first plurality of connectors, the first wire portion comprises a first plurality of wires, and the electrical conductor comprises a first plurality of electrical conductors. In some such embodiments, each connector in the first plurality of connectors is attached to the conduit portion by way of a wire from the first plurality of wires, each wire in the first plurality of wires comprises an electrical conductor from the first plurality of electrical conductors, and each electrical conductor in the first plurality of electrical conductors electrically couples a connector from the first plurality of connectors to the electrical conductor in the conduit portion.

Examples of such embodiments provide a connector portion having multiple connectors each on a separate, flexible and posable wire, which can be selectively shaped to a desired form (e.g., "L" shaped, "S" shaped). Additionally, depending on the embodiment, the first connector portion or the second connector portion may comprise two or more connectors and the electrical conductor may comprise multiple electrical conductors that individually or in combination electrically couple connectors of the first connector portion to the connectors of the second portion.

In further embodiments, the cable portion further includes: a first joint portion coupling the first wire portion to the conduit portion and comprising the electrical conductor; and a second joint portion coupling the second wire portion to the conduit portion and comprising the electrical conductor, wherein the first joint portion or the second joint portion comprises a tension relieving mechanism configured to relieve tension between portions of the cable portion adjacent to the first joint portion or the second joint portion.

For instance, the tension relieving mechanism: may be disposed between the first joint portion and the conduit portion and configured to relieve tension between the first joint portion and the conduit portion, may be disposed between the first joint portion and the first wire portion and configured to relieve tension between the first joint portion and the first wire portion, may be disposed between the second joint portion and the conduit portion and configured to relieve tension between the second joint portion and the conduit portion, or may be disposed between the second joint portion and the second wire portion and configured to relieve tension between the second joint portion and the second wire portion.

With respect to the connector portions, example connectors include, but are not limited to, High-Definition Multimedia Interface (HDMI) connectors, RCA connectors, tip-ring-sleeve (TRS) connectors, and TOSLINK connectors, Universal Serial Bus (USB) connectors, FireWire connectors, Digital Visual Interface (DVI) connectors, Mini DisplayPort Connectors, or Thunderbolt connectors.

In additional embodiments, the cable further comprises an adapter configured to convert the electrical signal from a first signal format to a second signal format. For example, the adapter can be configured to convert an electrical signal received from an HDMI connector and converter and send the electrical signal optically via a TOSLINK connector. Depending on the embodiment, the electrical signal may be carried from the first connector portion to the second connector portion, or from the second connector portion to the first connector portion. Additionally, in some embodiments, the adapter may be disposed in the first connector portion or the second portion, or disposed in the first joint portion or the second joint portion.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF VARIOUS EMBODIMENTS

The present invention is directed toward cables configured for communicating electrical signals (i.e., electrical cables). Depending on the embodiment, the electrical cable may be configured to be utilized in variety of environments including, but in no limited to, audio-visual setups and computer setups. For instance, some embodiments may be utilized in a home theater setup where the embodiment individually interconnects the HDMI interfaces of multiple audio-visual devices, such as that of a gaming console, a video player, and a cable television receiver, to the multiple HDMI interfaces of a television. In the context of a computer setup, some embodiments may individually interconnect the USB interfaces of multiple computing devices, such storage devices, cameras, and printers, to the multiple USB interfaces of a desktop or laptop computer. As noted herein, some such embodiments allow for improved organization, routing, and arrangement of electrical cables utilized in interconnecting audio/video (A/V) components. The use of some embodiments may not only result in visually appealing arrangements of electrical cables but also in easier user access to the cables and the components they interconnect.

Figure 1A:
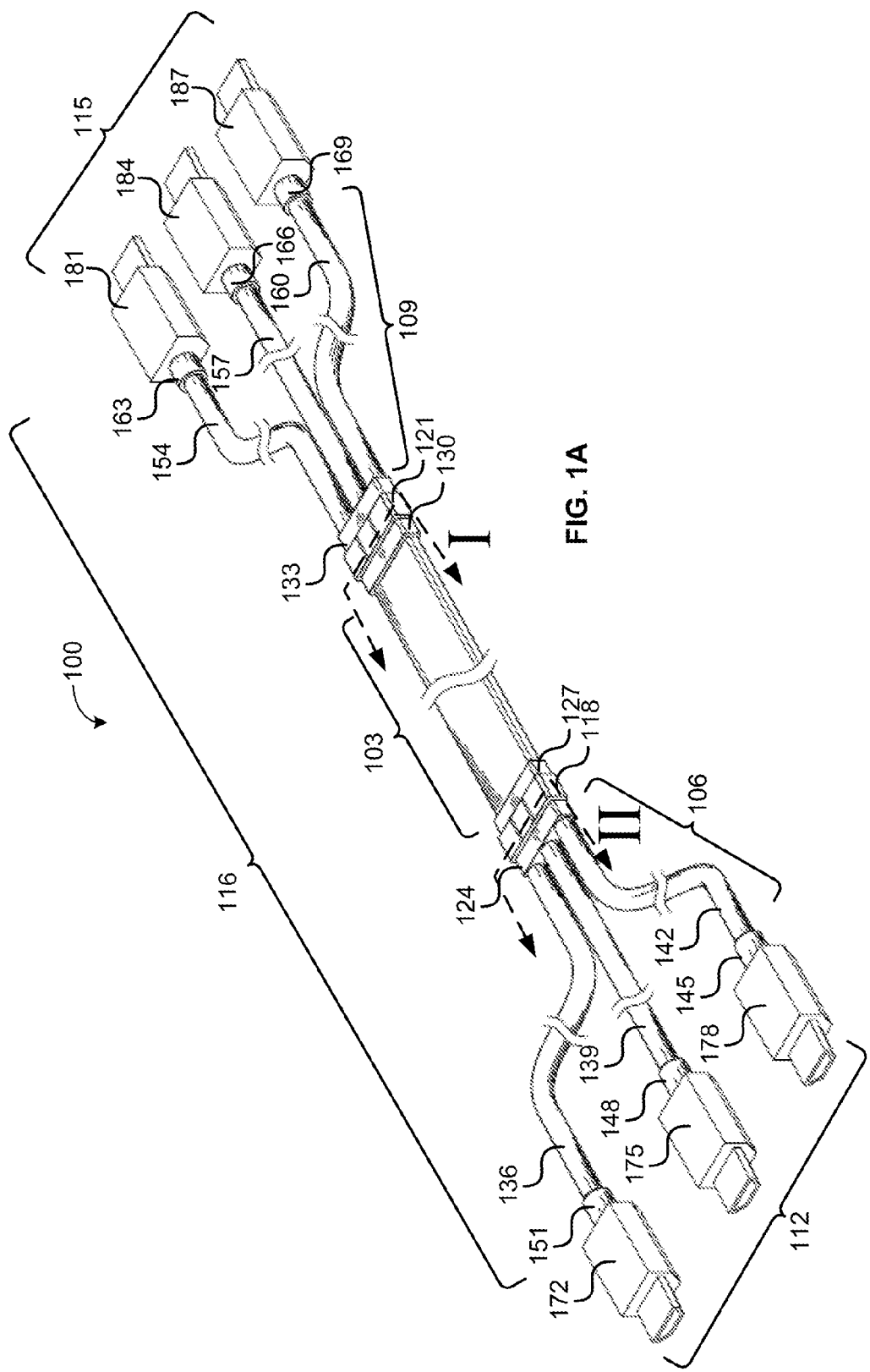
FIG. 1A is a diagram illustrating an example electrical cable in accordance with some embodiments.

Referring now to the drawings, FIG. 1A is a diagram illustrating an example electrical cable in accordance with an embodiment of the invention. As shown, the electrical cable 100 includes a first set of connectors 112, a second set of connectors 115, and a cable portion 116 coupling the first set of connectors 112 to the second set of connectors 115. The cable portion 116 may comprise a first wire portion 106 that couples to the first set of connectors 112, a second wire portion 109 that couples to the first set of connectors 115, and a conduit portion 103 that couples the first wire portion 106 to the second wire portion 109. In particular, the first wire portion 106 may comprise the wires 136, 139, and 142, and second wire portion 109 may comprise the wires 154, 157, and 160. Each of the wires 136, 139, and 142 respectively couples the connectors 172, 175, and 178 of the first set of connectors to the conduit 103. Likewise, each of wires 154, 157, and 160 respectively couples the connectors 181, 184, and 187 of the second set of connectors to the conduit 103.

In various embodiments, the wires 136, 139, 142, 154, 157, and 160 can be of various lengths, with each of the wires of the first wire portion 106 and each of the wires of the second wire portion 109 having equal lengths or differing lengths. For various embodiments, the lengths of wires in the first wire portion 106 or the second wire portion 109 may have staggered length. A staggered length arrangement may permit some embodiments to interconnect components (e.g., DVD player, game system, and cable box) in a particular arrangement (e.g., stacked components) to another component (e.g., television) without unnecessary slack in the wires.

Depending on the embodiment, either the wires (136, 139, and 142) of the first wire portion 106, the wires (154, 157, and 160) of the second wire portion 109, or both wire portions are flexible and posable. The flexibility and posability of these elements may be attributed to the conductive material contained within the wire elements, the sheathing that covers the wire elements, or both. Additionally, in some embodiments, these flexible and posable elements may be selectively bent by a user (e.g., an owner of an A/V setup) such that they form and retain a first shape defined by the user. Subsequently, the user can choose to selectively bend the elements again to form form and retain another shape (i.e., second) defined by the user.

For example, initially the user may selectively bend the elements of the first wire portion 106 to form and retain an "S" shape and then, subsequently, selectively bend the elements of the first wire portion 106 to form and retain an "L" shape. The user may selectively shape the wire elements with or without the use a tool (e.g., plier).

In addition to coupling the first wire portion 106 to the second wire portion 109, the conduit portion 103 may be flexible for the purposes of routing the electrical cable 100. For some embodiments, the conduit portion 103 may further be posable such that a user can selectively bend and shape the conduit portion 103 to retain a specific shape, much like the wire portions. The flexibility and posability of the conduit portion 103 may be attributed to conductive elements in the conduit portion 103, or to the sheathing of the conduit portion 103.

In coupling the first wire portions 103 to the second wire portions 109, the conduit portion 103 generally contains the conductive elements required to couple the two wire portions. For instance, as illustrated in FIG. 1A, the first set of connectors 112 has three connectors (172, 175, and 178) that couple to three connectors (181, 184, and 187) of the second set of connectors 115. Accordingly, the conduit portion 103 for the electrical cable 100 contains one conductive element coupling the connectors of the first set 112 with the second set 115.

The wires (136, 139, and 142) of the first wire portion 106 may be coupled to the first set of connectors 112 through a first set of flexible or rigid joints (151, 148, and 145 respectively), while the wires (154, 157, and 160) of the second wire portion 109 may be coupled to the second set of connectors 115 through a second set of flexible or rigid joints (163, 166, and 169 respectively). The first wire portion 106 may be coupled to the conduit portion 103 through a first joint portion, and the second wire portion 109 may be coupled to the conduit portion through a second joint portion. The first joint portion may comprise flexible joints 124 and 127 and a first rigid joint between the flexible joints 124 and 127. Likewise, the second joint portion may comprise flexible joints 130 and 133 and a rigid joint 121 between the flexible joints 130 and 133.

Figure 1B:
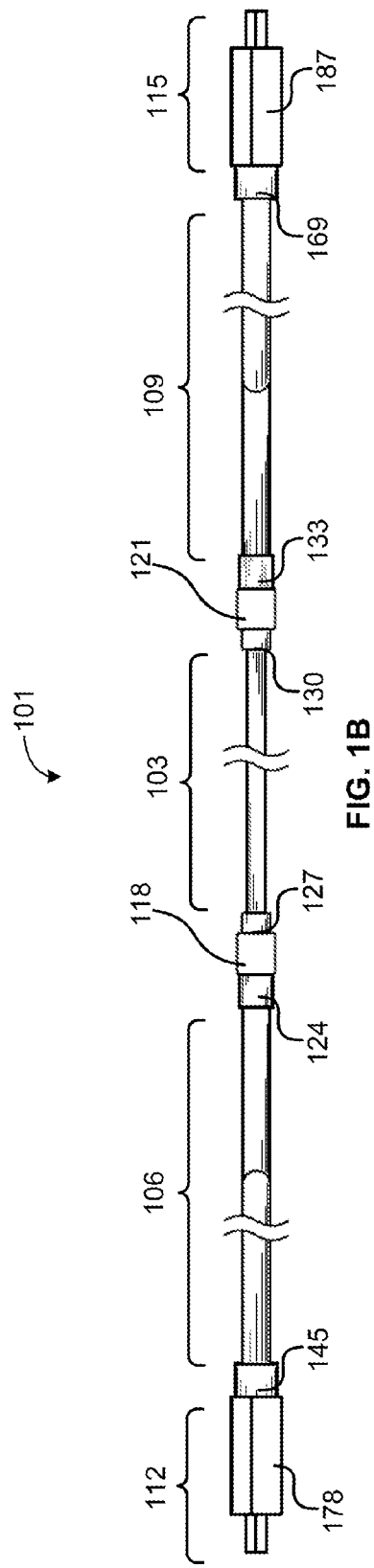
FIG. 1B is a diagram illustrating a side elevation view of the example electrical cable of FIG. 1A.

FIG. 1B is a diagram illustrating a side elevation view of the example electrical cable of FIG. 1A. As shown, the conduit portion 103 of electrical cable 100 is flat.

Those skilled in the art will appreciate that for some embodiments, the first set of connectors 112 and the second set of connectors 115 may each comprise as little as two connectors or more than three connectors. Additionally, in certain embodiments, the first set of connectors 112 may comprise less connectors than the second set of connectors 115, where conductive elements of two or more connectors of the second set of connectors 115 may be electrically combined (e.g., in the conduit 103) and coupled to a single connector of the first set of connectors 112.

Figure 2A:
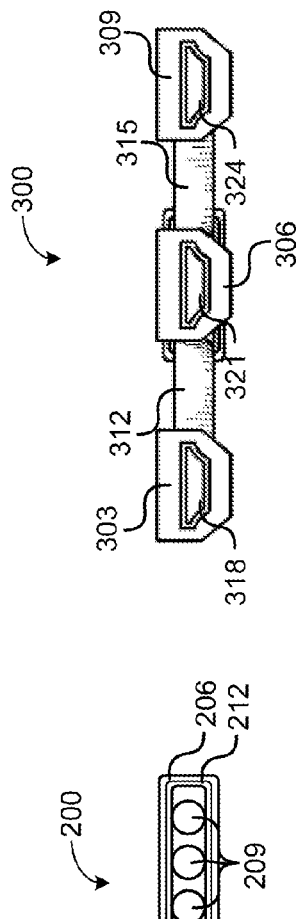
FIGS. 2A and 2B are diagrams illustrating a cross section views of the example electrical cable of FIG. 1A.
Figure 2B:
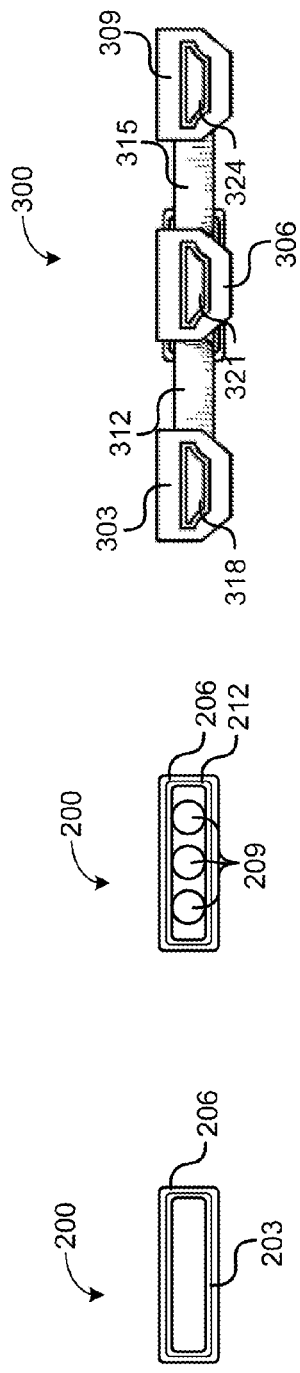

FIGS. 2A and 2B are diagrams illustrating a cross section views of the example electrical cable 100 of FIG. 1A. In particular, the FIGS. 2A and 2B illustrate a cross section of a joint portion 200 configured to couple a wire portion to a conduit portion. FIG. 2 illustrates the joint portion 200 from the perspective of a conduit portion, and illustrates the rectangular cross section of the joint portion 200. From the perspective of FIG. 2A, a flexible joint 203 and a rigid joint 206 are shown. From the perspective of FIG. 2B, a flexible joint 212 and the rigid joint 206 are shown. FIG. 2B also illustrates the cross section of wires 209 of a wire portion.

Figure 3:
FIG. 3 is a diagram providing a front elevation view of a connector portion of the example electrical cable of FIG. 1A.

FIG. 3 is a diagram providing a front elevation view of a connector portion 300 of the example electrical cable 100 of FIG. 1A. As shown, the connector portion 300 comprises a set of connectors 303, 306, and 309. Also shown is the wire portion, comprising a first wire 312 coupling the first connector 303 to a conduit portion, and a second wire 315 coupling the second connector to the conduit portion. The wire coupling the third connector 306 to the conduit portion is not shown from the perspective of FIG. 3. The connectors 303, 306, and 309 respectively comprises a first connector element 318, a second connector element 324, and a third connector element 321.

Figure 4:
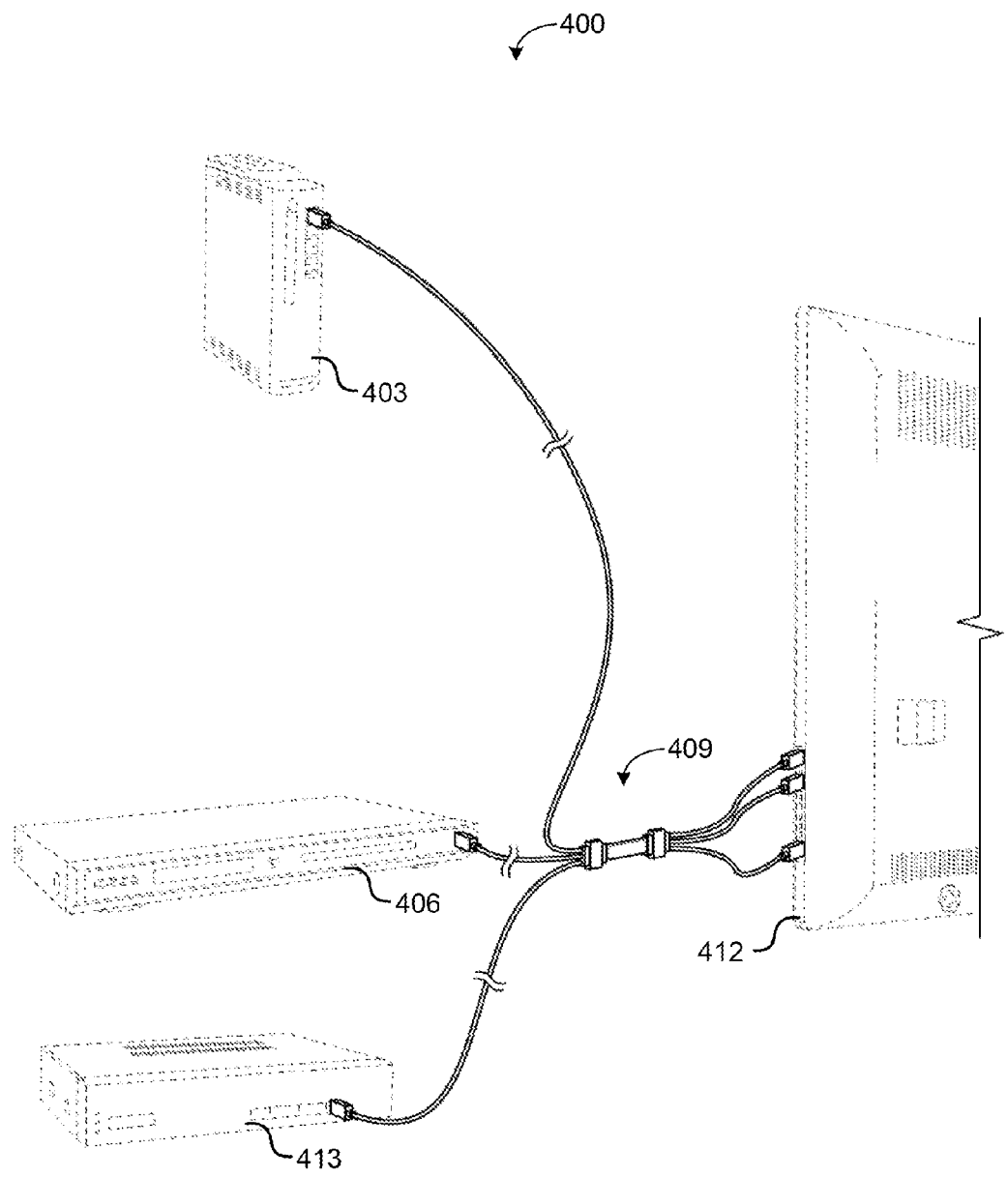
FIG. 4 is diagram illustrating use of an electric cable, in accordance with some embodiments, in use with an example environment.

FIG. 4 is diagram illustrating use of an electric cable 409, in accordance with some embodiments, in use with an example environment 400. The example environment 400 depicts an audio/video (A/V) setup in which various embodiments may be utilized to interconnect various A/V components with a television 412. In particular, a game system 403, a media player (e.g., DVD or Blu-ray® player) 406, and a cable box 413 are shown coupled to the television 412 using the electrical cable 409. In some embodiments, the one or both wire portions of the electrical cable 409 could have staggered wire lengths, thereby providing better arrangement of A/V components without the need for unnecessary slack in wire lengths. For example, the wire portion coupling the television 412 to the conduit portion of the electrical cable 409 may comprise wires of equal length, while the wire portion coupling the A/V components 403, 406, and 413 to the electrical conduit portion of the electrical cable 409 may comprise staggered length.

As used herein, the term set may refer to any collection of elements, whether finite or infinite. The term subset may refer to any collection of elements, wherein the elements are taken from a parent set; a subset may be the entire parent set. The term proper subset refers to a subset containing fewer elements than the parent set. The term sequence may refer to an ordered set or subset. The terms less than, less than or equal to, greater than, and greater than or equal to, may be used herein to describe the relations between various objects or members of ordered sets or sequences; these terms will be understood to refer to any appropriate ordering relation applicable to the objects being ordered.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

What is claimed is:

1. A cable for communicating electrical signals, the cable comprising:
   a first connector portion;
   a second connector portion;
   a cable portion coupling the first connector portion to the second connector portion, the cable portion including:
      a conduit portion comprising an electrical conductor configured to electrically couple an electrical signal between the first connector portion and the second connector portion,
      a first wire portion coupling the first connector portion to the conduit portion and comprising the electrical conductor, and
      a second wire portion coupling the second connector portion to the conduit portion and comprising the electrical conductor; and
   wherein the conduit portion is flexible, and at least one of the first wire portion and the second wire portions is flexible and posable such that a user can selectively bend the at least one wire portion to form and retain a first shape.

2. The cable of claim 1, wherein the at least one wire portion is further flexible and posable such that the user can selectively change the at least one wire portion from forming and retaining the first shape to forming and retaining a second shape.

3. The cable of claim 1, wherein the conduit portion is non-posable.

4. The cable of claim 3, wherein the conduit portion comprises a sheath that is non-posable.

5. The cable of claim 1, wherein the at least one wire portion comprises a sheath that is flexible and posable.

6. The cable of claim 1, wherein the conduit portion has a substantially square or rectangular cross section.

7. The cable of claim 1, wherein the conduit portion has an exterior surface comprising:
   a first side that is substantially flat; and
   a second side that is substantially flat, opposite the first side, and substantially parallel to the first side.

8. The cable of claim 7, wherein the exterior surface further comprises:
   a third side that is substantially flat; and
   a fourth side that is substantially flat, opposite the third side, and substantially parallel to the third side, wherein the third and the fourth sides are divergent to the first and second sides.

9. The cable of claim 8, wherein the third and fourth sides are substantially perpendicular to the first and second sides.

10. The cable of claim 1, wherein the electrical conductor comprises:
    a first conductor portion in the first wire portion;
    a second conductor portion in the second wire portion; and
    a third conductor portion in the conduit portion, wherein the first conductor portion or the second conductor portion is flexible and posable and the third conductor portion is flexible and non-posable.

11. The cable of claim 1, wherein the first connector portion comprises a first plurality of connectors, wherein the first wire portion comprises a first plurality of wires, wherein the electrical conductor comprises a first plurality of electrical conductors, wherein each connector in the first plurality of connectors is attached to the conduit portion by way of a wire from the first plurality of wires, wherein each wire in the first plurality of wires comprises an electrical conductor from the first plurality of electrical conductors, and wherein each electrical conductor in the first plurality of electrical conductors electrically couples a connector from the first plurality of connectors to the electrical conductor in the conduit portion.

12. The cable of claim 1, wherein the second connector portion comprises a second plurality of connectors, wherein the second wire portion comprises a second plurality of wires, wherein the electrical conductor comprises a second plurality of electrical conductors, wherein each connector in the second plurality of connectors is attached to the conduit portion by way of a wire from the second plurality of wires, wherein each wire in the second plurality of wires comprises an electrical conductor from the second plurality of electrical conductors, and wherein each electrical conductor in the second plurality of electrical conductors electrically couples a connector from the second plurality of connectors to the electrical conductor in the conduit portion.

13. The cable of claim 1, wherein the cable portion further includes:
   a first joint portion coupling the first wire portion to the conduit portion and comprising the electrical conductor; and
   a second joint portion coupling the second wire portion to the conduit portion and comprising the electrical conductor, wherein the first joint portion or the second joint portion comprises a tension relieving mechanism configured to relieve tension between portions of the cable portion adjacent to the first joint portion or the second joint portion.

14. The cable of claim 13, wherein the tension relieving mechanism is disposed between the first joint portion and the conduit portion and configured to relieve tension between the first joint portion and the conduit portion, the tension relieving mechanism is disposed between the first joint portion and the first wire portion and configured to relieve tension between the first joint portion and the first wire portion, the tension relieving mechanism is disposed between the second joint portion and the conduit portion and configured to relieve tension between the second joint portion and the conduit portion, or the tension relieving mechanism is disposed between the second joint portion and the second wire portion and configured to relieve tension between the second joint portion and the second wire portion.

15. The cable of claim 1, where the first connector portion or the second connector portion comprises a High-Definition Multimedia Interface (HDMI) connector, a RCA connector, a tip-ring-sleeve (TRS) connector, a TOSLINK connector, a Universal Serial Bus (USB) connector, a FireWire connector, a Digital Visual Interface (DVI) connector, Mini DisplayPort Connector, or a Thunderbolt connector.

16. The cable of claim 1, further comprising an adapter configured to convert the electrical signal from a first signal format to a second signal format.

17. The cable of claim 16, wherein the electrical signal is being carried from the first connector portion to the second connector portion.

18. The cable of claim 16, wherein the electrical signal is being carried from the second connector portion to the first connector portion.

19. The cable of claim 16, wherein the adapter is disposed in the first connector portion or the second connector portion.

20. The cable of claim 16, wherein the cable portion further includes:
   a first joint portion coupling the first wire portion to the conduit portion and comprising the electrical conductor; and
   a second joint portion coupling the second wire portion to the conduit portion and comprising the electrical conductor, wherein the first joint portion or the second joint portion comprises the adapter.

21. The cable of claim 1, wherein the first wire portion or the second wire portion comprises a plurality of wires, and wherein the plurality of wires have a staggered length arrangement configured to allow connection of a plurality of components in a particular arrangement.

\* \* \* \* \*